United States Patent [19]

Kuwayama et al.

[11] Patent Number: 4,610,337
[45] Date of Patent: Sep. 9, 1986

[54] PARKING BRAKE STRUCTURE FOR AUTOMATIC TRANSMISSION MECHANISM

[75] Inventors: Yoshinari Kuwayama; Masakatsu Miura, both of Anjo; Kunio Morisawa, Toyota, all of Japan

[73] Assignees: Aisin-Warner K.K., Anjo; Toyota Jidosha K.K., Toyota, both of Japan

[21] Appl. No.: 498,870

[22] Filed: May 27, 1983

[30] Foreign Application Priority Data

May 28, 1982 [JP] Japan ................................ 57-091723

[51] Int. Cl.$^4$ ............................................. B60K 41/26
[52] U.S. Cl. ...................................... 192/4 A; 188/31
[58] Field of Search ............. 192/4 A, 4 R; 74/411.5, 74/710.5, 99 A, 107, 569; 188/60, 31, 69, 72.7, 72.9

[56] References Cited

U.S. PATENT DOCUMENTS

| | | | |
|---|---|---|---|
| 3,361,234 | 1/1968 | Runyon | 192/4 A |
| 3,386,532 | 6/1968 | Moss | 192/4 A |
| 3,601,230 | 8/1971 | Platz | 192/4 A |
| 3,601,231 | 8/1971 | Kolacz | 74/411.5 |
| 3,912,050 | 10/1975 | Iwanaga et al. | 192/4 A |
| 4,089,394 | 5/1978 | Haupt et al. | 192/4 A |
| 4,223,768 | 9/1980 | Iwanaga | 192/4 A |
| 4,413,712 | 11/1983 | Richard | 192/4 A |

*Primary Examiner*—George H. Krizmanich
*Attorney, Agent, or Firm*—Cooper, Dunham, Griffin & Moran

[57] ABSTRACT

An automatic transmission locking mechanism for parking, comprising a detent lever interlocked with and adapted to be turned by a manual shift lever, a rod adapted to be advanced or retracted by the detent lever, a cam slidably mounted on the rod and adapted to push a pawl having a detent to the operating position where the detent engages with a parking gear when the automatic transmission is placed in the parking range, a bracket on which the cam runs and a spring for disengaging the detent from the parking gear and for retaining the pawl at the released position. The spring is disposed in the vicinity of the free end of the pawl and within a plane in which the pole turns, with one end thereof engaged with the free end portion of the pawl and with the other end thereof fixed in a finished hole formed in a stationary part.

3 Claims, 2 Drawing Figures

PARKING BRAKE STRUCTURE FOR AUTOMATIC TRANSMISSION MECHANISM

BACKGROUND OF THE INVENTION

1. Field of the Invention

This invention relates to an automatic transmission locking mechanism for an automatic transmission of a vehicle, particularly for an automatic transmission of a reduced axial dimension for a vehicle.

2. Description of the Prior Art

In most front-engine front-drive automobiles (designated as "FF automobiles" hereinafter), the engine is mounted transversely. Accordingly, the axial dimension of an automatic transmission for an FF autombile is required to be reduced, particularly when the engine is mounted transversely.

Most conventional automatic transmission locking mechanisms interlocked with a manual shift lever employ the following constitution. That is, a lever is joined integrally to a manual shaft which is turned through the manual operation of a manual shift lever, the rear end of a cam rod provided intermediately with a cam is linked to the lever, a pawl with a detent is pushed up when the cam is caused to run on a slope formed in a bracket supporting the front portion of the cam rod extending forward from the cam, whereby the detent engages with a parking gear fixed to the output shaft of the transmission to lock the output shaft. A spring mechanism is provided in order to retain the pawl provided with the detent away from the parking gear to prevent the accidental contact between the detent and the parking gear during running. According to the prior art, such a spring mechanism has been constituted in a type in which the pawl having a detent is retained by the resilience of a torsion spring mounted round a shaft on which the pawl having a detent is turned and engaged at one end thereof with the pawl and at the other end thereof with a case or in a type in which the pawl having a detent is retained by the resilience of a coil spring joined at one end thereof to the free end portion of the pawl and fixed at the other end thereof to a case. The former type require a shaft of an increased length on which the pawl is turned to mount a torsion spring thereon, which increases the axial dimension of the mechanism, besides, a strong torsion spring is necessary. The latter type require a wide space within a plane in which the pawl turns due to the use of a coil spring. Furthermore, since one end of the spring is engaged with or fixed to the unfinished surface of a case in either type, the effective resilience of the spring changes between assemblies.

SUMMARY OF THE INVENTION

Accordingly, it is an object of the present invention to provide an automatic transmission locking mechansim capable of disposing the spring within a space of a reduced dimension along the axial direction of the shaft on which the pawl is turned, of employing a spring of a reduced dimension and a reduced resilience and of providing a highly accurate resilience of the spring, compact, of high-performance and suitable for use in an automatic transmission for an FF automobile.

An automatic transmission locking mechanism according to the present invention includes a detent lever interlocked with and adapted to be turned by a manual shift lever, a rod adapted to be advanced and retracted by the detent lever, a cam mounted on the rod and adapted to push a pawl having a detent to the operating position thereof when the automatic transmission is placed in the parking range, a bracket on which the cam runs, a parking gear, the said pawl having a detent which engages with the parking gear and a spring which releases the detent from the parking gear and retains the pawl at the released position, wherein the spring for retaining the pawl having the detent at the released position is a torsion spring disposed in the vicinity of the free end of the pawl and within a plane in which the pawl turns, engaged at one end thereof with the free end portion of the pawl and fixed at the other end thereof to a finished hole formed in a stationary part.

Other objects and features of the present invention will become apparent from the following detailed description of the preferred embodiment thereof, taken in connection with the accompanying drawings.

DESCRIPTION OF THE PREFERRED EMBODIMENT

Figure 2:
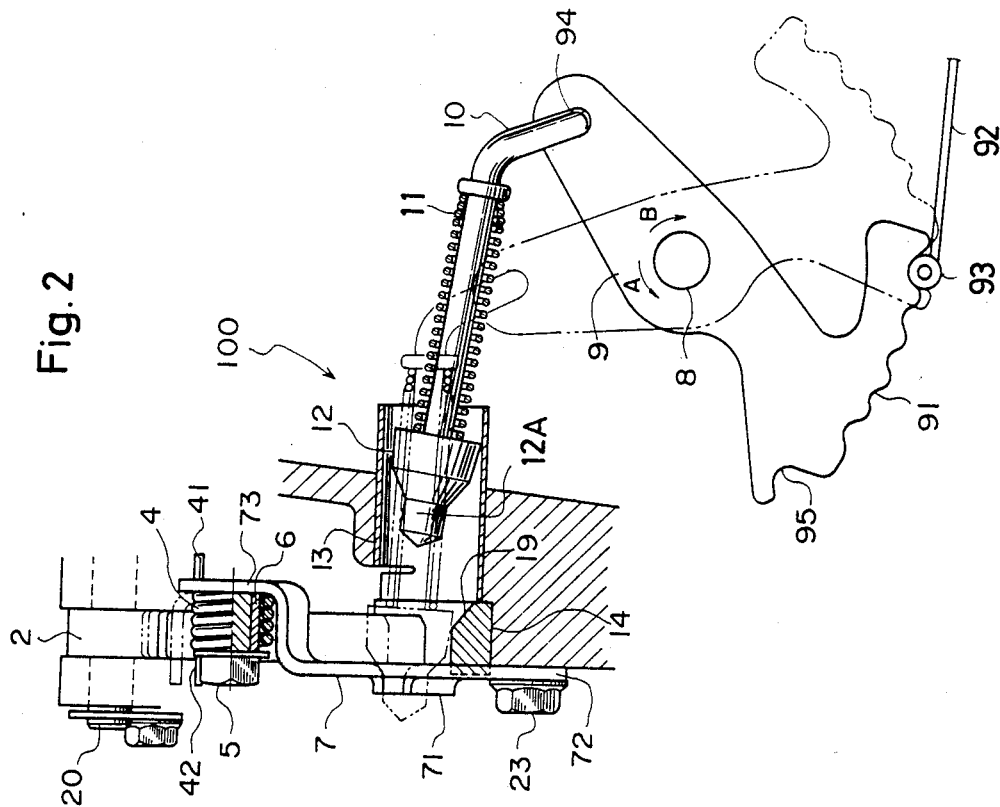
FIG. 2 is a side view of the automatic transmission locking mechanism of FIG. 1, for facilitating the description of the operation thereof.
Figure 1:
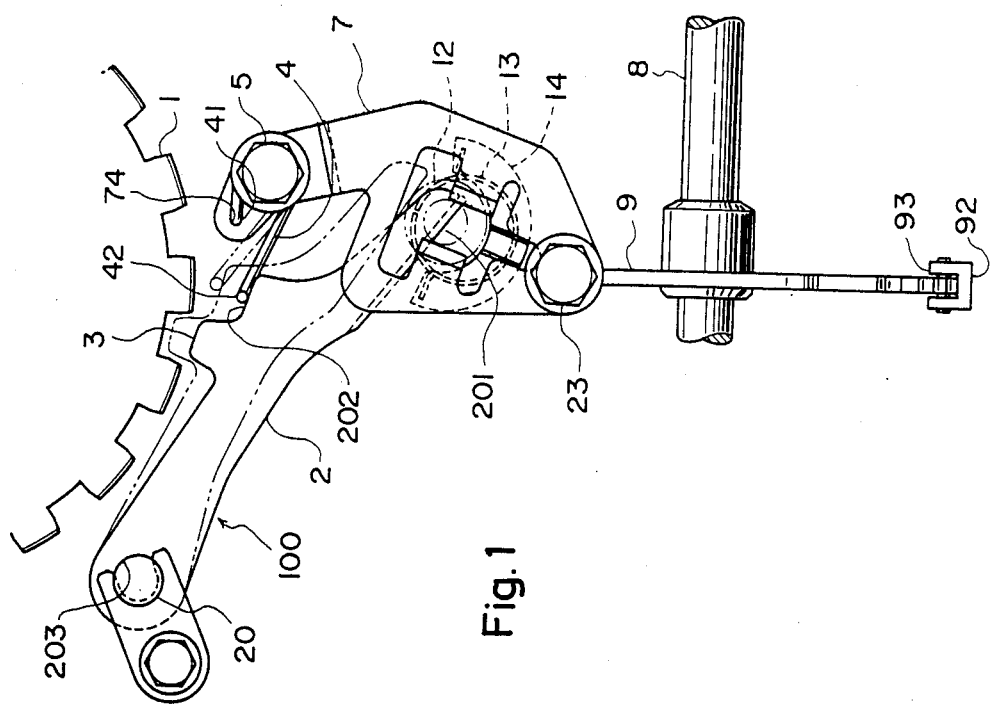
FIG. 1 is a front view of an automatic transmission locking mechanism according to the present invention for facilitating the description of the operation thereof.

An automatic transmission locking mechanism 100 includes a detent lever 9, a rod 10, a cam 12, a sleeve 13, a bracket 14, a pawl 2 having a detent 3, a torsion coil spring 4, a support plate 7 and a parking gear 1.

The detent lever 9 is directly coupled with a manual shaft 8 which is rotatively interlocked with a manual shift lever, not shown, disposed beside the driver's seat. The detent lever 9 is of a plate form and is turned together with the manual shaft 8 about the axis of the manual shaft 8. The free end 93 of a detent spring 92 engages, one at a time, with a plurality of notches 91 (in this embodiment, six notches corresponding to the parking, the reverse, the neutral, the drive, the 3rd and the low positions, respectively, of the automatic transmission) formed in the circular edge of the detent lever 9. A round rod 10 is linked with the detent lever 9 by rotatably fitting the curved rear end of the rod 10 in a hole 94 formed in the detent lever 9 opposite to the notches 91 with respect to the manual shaft 8. The rod 10 is advanced as the lever 9 is turned in a counterclockwise direction. A cam 12 is slidably mounted on and connected with a coil spring 11 mounted round the rod 10 to the rod 10 to form a cam rod. As the rod 10 is pushed forward, the cam 12 is pushed forward by the coil spring 11. The cam 12 is formed of a conical surface of a sharp conical angle and a conical surface of an obtuse conical angle each tapering toward the free end of the rod 10. The cam 12 is advanced through the tubular sleeve 13 fitted in a case as the detent lever 9 is advanced, is caused to run on a slope 19 formed in the semicircular bracket 14 fixed to the case by the plate 7 with bolts 5 and 23 and then is forced into a gap formed ahead of the sleeve between the bracket 14 and the free end portion 201 of the pawl 2 having the detent 3 to push up the pawl 2 gradually. Upon the arrival of the cam 12 at the top of the slope formed in the bracket 14, the free end 93 of the detent spring engages with the parking position notch 95 of the detent lever 9 and thereby the cam 12 pushes the pawl 2 to a position indicated by alternate long and two short dashes line. The pawl 2 is a bar-shaped member curved in a predetermined configuration and having an engaging part 201 formed in the free end portion thereof for engagement with the cam 12, the detent 3 formed in the intermediate portion thereof, a seat 202 formed near the detent 3 on the side of the free end of the member with respect to the detent 3 for receiving one end of the torsion spring 4 and a hole 203 formed at the other end thereof for receiving a pawl shaft 20 therethrough. As the cam 12 pushes up the free end of the pawl 2, the pawl 2 is turned on the pawl shaft 20 in a direction perpendicular to the direction of advancement of the cam 12, whereby the detent 3 is engaged with the parking gear 1 to lock the automatic transmission.

A hole 71 for receiving the front portion 12A of the cam 12 when the automatic transmission is placed in the parking position is formed in the plate 7 coaxially with the semicircular bracket 14. The plate 7 is fastened at one part (lower part in the drawing) 72 and at the other part (upper part in the drawing) 73 to the case with the bolts 23 and 5 respectively. The upper part 73 of the plate 7 is formed in a crank-shape. The torsion coil spring 4 is mounted round a spacer 6 fitted on the projecting part of the bolt 5 fastening the crank-shaped upper part 73 of the plate 7 to the case, so as to be disposed within a plane in which the pawl 2 turns, with one end 41 thereof engaged with a hole 74 formed in the plate, namely, a finished hole formed in a finished part, and with the other end 42 engaged with the seat 202 formed in the pawl 2 nearby the detent 3 to bias the free end 201 of the pawl 2 toward the bracket 14.

The manner of operation to lock or to release the parking gear 1 will be described in detail hereunder. When the detent lever 9 is turned in the direction of the arrow A through the manual operation of the shift lever and the free end 93 of the detent spring is engaged with the parking notch 95, the cam 12 is positioned on top of the bracket 14 to push up the pawl 2 as far as the detent 3 of the pawl 2 is engaged with the parking gear 1. Since the detent 3 of the pawl 2 is incapable of engaging with the parking gear 1 while the parking gear 1 is turning at a revolving rate above a predetermined revolving rate, the rotative vibration of the pawl 2 and the axial vibration of the cam 12 occur due to the effect of the resilience of the torsion coil spring 4 working to turn the pawl 2 on the pawl shaft 20 in a direction away from the parking gear 1 and the counteracting force of the coil spring 11 supporting the cam 12, which force acting on the pawl 2 in a direction toward the parking gear 1. When the revolving rate of the parking gear 1 is reduced below the predetermined revolving rate, the pawl is turned on the pawl shaft 20 toward the parking gear 1 and the detent 3 is engaged with the parking gear 1 by the balance of force between the force of the torsion spring acting to bias the pawl away from the parking gear 1 and the force of the coil spring acting to bias the pawl toward the parking gear 1.

When the detent lever 9 is turned manually in the direction of the arrow B while the detent 3 is engaged with the parking gear 1, the resilience of the coil spring 11 supporting the cam 12 becomes insufficient to cause the detent to engage with the parking gear 1, the detent 3 is disengaged from the parking gear 1 by the resilience of the torsion coil spring 4.

Since the slope 19 of the bracket 14 is formed in a conical shape, the cam 12 is raised perpendicularly to the engaging surface formed in the free end portion 201 of the pawl 2 after leaving the sleeve while being advanced to push up the free end of the pawl 2. After the cam 12 has left the sleeve, the cam 12 is supported by the plate 7.

As described hereinbefore, the automatic transmission locking mechanism includes a detent lever interlocked with and adapted to be turned by a manual shift lever, a rod adapted to be advanced and retracted by the detent lever, a cam mounted on the rod and adapted to push a pole having a detent to the operating position thereof when the automatic transmission is placed in the parking range, a bracket on which the cam runs, a parking gear, the said pawl having a detent which engages with the parking gear and a spring which releases the detent from the parking gear and retains the pawl at the released position, wherein the spring for retaining the pawl having the detent at the released position is a torsion coil spring disposed in the vicinity of the free end of the pawl and within a plane in which the pawl turns, engaged at one end thereof with the free end portion of the pawl and fixed at the other end thereof to a hole formed in a stationary part, consequently, the dimension along the axial direction of the shaft on which the pawl turns of the space for disposing the spring for retaining the pawl having the detent is reduced, a small and weak spring is applicable to the mechanism and highly accurate resilience of the spring acts on the pawl. Thus the automatic transmission locking mechanism of the present invention has a compact construction, is of a high-performance and is suitably applicable to an automatic transmission for an FF automobile.

We claim:

1. An automatic transmission locking mechanism comprising a manual shift lever having a locking position, a detent level interlocked with and adapted to be turned by the manual shift lever, a rod adapted to be advanced or retracted by the detent lever, a cam mounted on the rod, a bracket on which the cam runs, a pawl having a detent and a free end portion and adapted to be pushed by the cam to an operating position from a released position thereof when the manual shift lever is placed to the locking position, a pawl shaft on which the pawl turns, a parking gear engaged with the detent when the pawl is in the operating position, a projecting part in the vicinity of the free end disposed on a stationary member and a torsion coil spring mounted around the projecting part within a plane in which the pawl turns and secured at one end to the stationary member and engaged with the pawl at the other end to bias the pawl from the operating position to the released position.

2. An automatic transmission locking mechanism according to claim 1, the stationary member having a transmission case and a plate fastened at one part to the case to fix the bracket to the case and formed in crank-shape at the other part at which the projecting part is disposed.

3. An automatic transmission locking mechanism according to claim 2, the projecting part having a bold and a spacer mounted around the bolt, a plate means attached to the transmission case to rigidly secure the bracket to the transmission case and at the same time retaining the torsion coil spring means on the oscillating plane in which the pawl element pivots.

* * * * *